Aug. 11, 1964　　　D. S. WAHLSTROM　　　3,143,928
SERVOMOTOR CONTROL SYSTEM
Filed Nov. 30, 1961
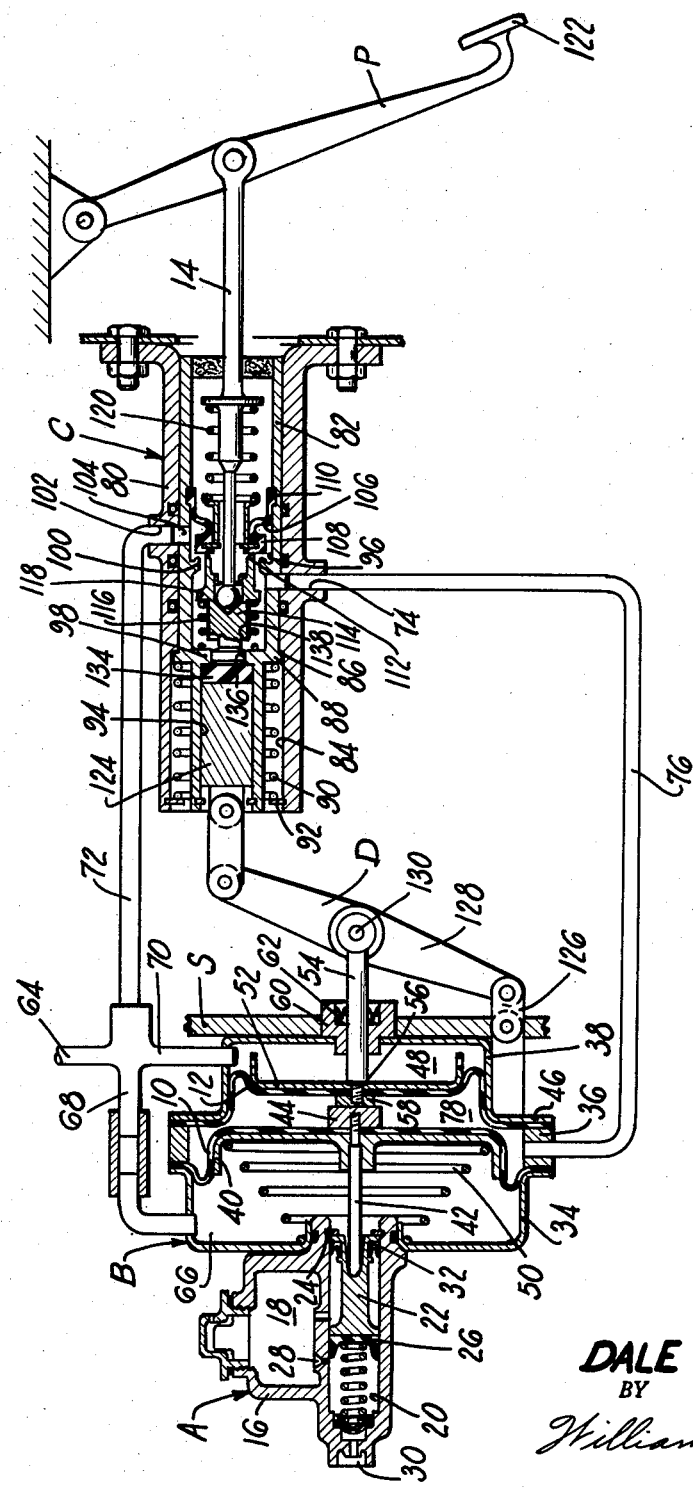
INVENTOR.
DALE S. WAHLSTROM
BY
*William P. Hickey*
ATTORNEY

2

United States Patent Office 3,143,928
Patented Aug. 11, 1964

3,143,928
SERVOMOTOR CONTROL SYSTEM
Dale S. Wahlstrom, South Bend, Ind., assignor to The Bendix Corporation, South Bend, Ind., a corporation of Delaware
Filed Nov. 30, 1961, Ser. No. 156,058
3 Claims. (Cl. 91—391)

The present invention relates to reaction producing control mechanisms for servomotors; and more particularly to reaction producing control mechanisms for fluid pressure servomotors.

Servomotors, and particularly fluid pressure servomotors with which I am familiar, conventionally mount the control mechanism on the power actuated element of the servomotor so that there is a follow-up movement of the servomotor's driven element by its control element. One of the largest uses of fluid pressure servomotors today is the power actuation of the hydraulic master cylinders of automotive braking systems; and in this use, it is important that the movable elements of the servomotor be capable of being moved with physical force so that the brakes can be applied manually on power failure. Inasmuch as the hydraulic piston of the conventional master cylinder has a short stroke of approximately one inch, it is necessary that the brake pedal leverage system which operates the control valve structure have a mechanical advantage of approximately 6 to 1 in order that the force which is applied by the operator will be sufficient to operate the brakes manually. This requires that the manually acuated elements of the control valve structure be made stronger than would otherwise be necessary to perform their air controlling function, and in fact must be sized strong enough to take the maximum physical force which the operator can apply through the force multiplying brake pedal lever system.

Conventional fluid pressure servomotors which are used to actuate the power braking systems of automotive vehicles further include means for providing a reaction force which opposes actuating movement of its control structure with a force which is smaller than, but proportional to, the force being delivered to the master cylinder to apprise the operator of the amount of braking effort being produced. It has been proposed in some instances to provide a servomotor construction wherein the control valve structure is housed within the servomotor unit in such manner that it does not move during a normal power actuation, but in a manner which will still permit the power driven elements of the servomotor to be moved manually. This has required that the servomotor unit be quite large and cumbersome, and therefore incapable of being installed on many vehicles.

An object of the present invention is the provision of a new and improved servomotor control system in which the control valve structure for the servomotor is remotely located from the fluid pressure motor unit, but a reaction force is produced upon the control member of the control valve; and wherein the power driven elements of the fluid pressure motor can still be actuated manually on power failure.

Another object of the present invention is the provision of a new and improved servomotor system wherein manually applied force on a control valve structure is increased by a force multiply leverage system and then is transmitted to the driven elements of the servomotor system.

A still further object of the present invention is the provision of a new and improved servomotor actuating system in which its control valve structure is located remotely from the fluid pressure motor, the fluid pressure motor is equipped with means for providing a reaction, and the fluid pressure motor and control valve structure are connected by a force transmitting leverage system having a mechanical advantage greater than one.

The invention resides in certain constructions and combination and arrangements of parts; and further objects and advantages of the invention will become apparent to those skilled in the art to which the invention relates from the following descripiton of the preferred embodiment described with reference to the accompanying drawing forming a part of the specification, and in which:

The solidary figure of the drawing is a somewhat schematic view of a fluid pressure servomotor driven master cylinder of the braking system of an automotive vehicle, and in which the control valve structure and servomotor are shown in section.

The servomotor driven master cylinder arrangement shown in the drawings generally comprises a conventional master cylinder A that is bolted directly to one end of a fluid pressure motor B that is equipped with a power driven movable wall 10 and a reaction producing movable wall 12. The fluid pressure motor B is in turn connected to a rigid support S, which in some instances may be the firewall of an automotive vehicle; and the motor B is controlled by a remotely located control valve structure C, which may in some instances be located beneath the instrument panel of an automotive vehicle. The control valve structure C is controlled by a conventional push rod 14, which in turn is actuated by means of the foot pedal lever P. The control system shown is capable of providing a reaction force upon the control rod 14, and is also used to actuate the power driven movable wall 10 manually. This is accomplished by means of a force transmitting leverage systems D having a mechanical advantage greater than one.

As previously indicated, the master cylinder A is of conventional construction and generally comprises a cast housing 16 having the usual fluid pressure resorvoir 18 positioned in the region overlying the fluid pressurizing chamber 20. Fluid is adapted to be forced out of the fluid pressurizing chamber by means of a hydraulic piston 22 that is normally located against a snap ring 24 in the rear end of the chamber 20. A cup seal 26 is provided on the front end of the piston 22 so that its lip slides over a compensating port 28 upon forward movement of the piston 22 to close off communication of the chamber 20 with the reservoir 18. Thereafter fluid is forced out of the outlet 30 of the master cylinder. A seal 32 is provided on the rear end of the hydraulic piston 22 so as to prevent leakage out of the rear end of the master cylinder.

As previously indicated, the master cylinder A is bolted directly to the front end of a fluid pressure motor B, whose shell is formed by means of front, middle and rear sections 34, 36 and 38 respectively. The outer periphery of the power diaphragm 10 is clamped between the front and middle shell sections 34 and 36, and the outer periphery of the diaphragm 12 is clamped between the middle and the rear sections 36 and 38 of the fluid pressure motor housing. A diaphragm stiffening plate 40 is provided forwardly of the power diaphragm 10; and the diaphragm 10 is clamped thereto by means of a threaded push rod 42, which has a small diameter portion which extends through the stiffening plate and diaphragm and is threaded into a holddown nut 44. The front end of the push rod 42 bears against the hydraulic piston 22 in the usual manner, so as to be capable of driving the hydraulic piston 22 forwardly.

The reaction diaphragm 12 does not need to develop as much force as the power diaphragm 10, and accordingly, the rear shell section 38 is provided with an inwardly extending shoulder 46 which materially reduces the size of the internal reaction chamber 48 that is provided within the rear shell section 38. The diaphragm 12 extends over the shoulder 46, and provides a suitable return stop for the power diaphragm 10. The power diaphragm 10 is normally held in engagement with the portion of the reaction diaphragm 12 that lays up against the shoulder 46 by means of a power piston return spring 50.

The reaction diaphragm 12 is in turn stiffened by a back-up plate 52 that is positioned against the rear surface of the diaphragm 12 and is held in place by a small diameter threaded projecting portion of a force transmitting rod 54 whose shoulder 56 abuts the back-up plate 52 and is held in place by a holddown nut 58 that is tightened against the diaphragm 12. The rod 54 extends through a suitable fitting 60 in the rear portion of the shell 38 and a suitable seal 62 extends between the rod 54 and fitting 60 to prevent the entry of air into the reaction chamber 48.

While any suitable type of fluid pressure motor can be used, the fluid pressure motor B shown in the drawing is a vacuum suspended unit which utilizes the pressure differential between the atmosphere and the manifold vacuum of the vehicle's propelling engine for providing the motive force for the power and reaction diaphragms 10 and 12. Vacuum from the vehicle's propelling engine enters through the vacuum line 64, from whence it flows to the low pressure chamber 66 on the front side of the power diaphragm 10 through the branch line 68, as well as to the reaction chamber 48 through the branch line 70. Vacuum is also communicated to the control valve structure C through the branch line 72; and in the normal brake de-energizing condition of the control valve C, this same vacuum is communicated through the control port 74, and the interconnecting line 76 to the control chamber 78 of the fluid pressure motor B which lies in the region between the power and reaction diaphragms 10 and 12. In the normal condition of the servomotor B therefore, vacuum of equal intensity exists in the chambers 66, 78 and 48; and the unit is power actuated by admitting atmosphere to the control chamber 78 to force the power diaphragm 10 and reaction diaphragm 12 apart.

The control valve C may be of the type whose housing moves along with the control member so as to provide follow-up of the driven elements of the fluid pressure motor B, but is preferably of the type whose housing remains stationary so that very little movement of the foot pedal lever P will normally take place during power actuation of the fluid pressure motor B. In the embodiment shown in the drawing, the control valve structure C is received in a guide tube 80 having a rear flange which is suitably bolted to a stationary structure beneath the instrument panel of the automobile; and the guide tube 80 slidably receives and carries a tubular housing member 82 of the control valve C. The front end of the internal chamber of the guide tube C is counterbored as at 84 to provide a shoulder 86 against which a flange 88 on the tubular housing 82 is normally held by means of a coil spring 90. Coil spring 90 is positioned in a counterbore 84 between the flange 88 and a suitable snap ring 92 in the front end of the guide tube 80.

The tubular housing 82 has a central opening therethrough which is divided into a front reaction section or chamber 94, and a control section or chamber 96 by means of an integral partition portion 98. The control chamber 96 is also provided with a small shoulder forming a vacuum valve seat 100; and the branch vacuum line 72 communicates through aligned openings 102 and 104 in the guide 80 and housing 82 to the region just rearwardly of the vacuum valve seat 100. The vacuum inlet 104 is adapted to be sealed off by means of an annular rubber diaphragm structure 106 having a stiffened front portion 108 adapted to abut the vacuum valve seat 100, and a flexible rear portion 110 whose periphery is suitably sealed with respect to the sidewalls of the tubular valve housing 82 rearwardly of vacuum inlet port 104. An atmospheric valve seat 112 is formed on the rear end of a control member 114 that is positioned forwardly of the vacuum valve seat 100, and which is adapted to extend rearwardly through the vacuum valve seat for abutment with the stiffened portion 108 of the diaphragm sealing structure 106. In the normal de-energized condition of the system, the control member 114 is biased rearwardly by means of a coil spring 116 positioned between the partition 98 and a suitable flange 118 on the control member, to seal off the central opening through the annular rubber diaphragm structure 106. At the same time the rubber diaphragm structure 106 is moved out of engagement with the vacuum valve seat 100; so that vacuum from the branch line 72 is communicated past vacuum valve seat 100 to the control line 76 leading to the control chamber 78 of the fluid pressure motor B.

Atmospheric pressure is always communicated to the rear end of the tubular valve housing 82; and a like coil spring 120 is provided between a suitable flange on the control rod 14 and the diaphragm structure 106 to assure a positive seal with respect to the atmospheric valve seat 112 to prevent atmospheric pressure from flowing past the control member 114 when its seat 112 engages the diaphragm structure.

Upon application of force to the pressure pad 122 of the foot pedal lever P, the lever P pivots about its upper end to force the control rod 14 inwardly, and thereby move the control member 114 forwardly with respect to the vacuum valve seat 100. The sealing portion 108 of the diaphragm 106 follows the forward movement of the control member 114 until it engages the vacuum valve seat 100; whereupon further vacuum communication with the control chamber 78 of the fluid pressure motor B is prevented. Thereafter a slight further forward movement lifts the atmospheric valve seat 112 out of engagement with the rubber diaphragm structure 106 to allow air pressure to pass around the control member 114 and flow to the control chamber 78. Air pressure admitted to the control chamber 78 forces the power diaphragm 10 forwardly to actuate the braking system, and at the same time forces the reaction diaphragm 12 rearwardly by an amount which is proportional to the brake applying force that is exerted upon the master cylinder A.

In order that the operator will be apprised of the amount of force being applied to the braking system, a reaction plunger 124 is provided in the reaction chamber 94, and the reaction plunger 124 is connected to the force transmitting rod 54 through a suitable force transmitting linkage. The force transmitting linkage shown in the drawing includes an idler link 126—one end of which is suitably pivoted to a fixed support, and the other end of which is pivoted to a force transmitting link 128 whose upper end is suitably pinned to another idler link 132 that is fastened to the reaction plunger 124. A suitable pivotal connection 130 is provided between the force transmitting rod 54 and the force transmitting link 128 intermediate the ends of the lever 128 so that the force applied to the reaction plunger 124 will produce an increased force on the force transmitting rod 54. Force produced upon the reaction diaphragm 12 therefore, is exerted through the force transmitting rod 54 to the reaction plunger 124 to produce a reaction force which is a fraction of that being exerted on the rod 54.

In some instances, the reaction plunger 124 may be directly connected to, or may be an integral part of the control member 114 to at all times provide a reaction force against the foot of the operator. In the embodiment shown in the drawing, however, a delayed reaction is obtained by positioning a block 134 of elastomeric material between the plunger 124 and the partition 98 so that an internal unit pressure is developed within the block of elastomeric material that is indicative of the reaction force being exerted thereon. A small opening 136 is provided through partition 98, and the control member 114 is provided with an extension which projects into the opening 136 but remains a slight distance out of engagement with the block 134 when the control member 114 is in its forward position above described wherein it communicates air flow to the control chamber 78. As air flows to the control chamber 78, the force exerted upon the block of elastomeric material, which in this instance is rubber, increases to force the material into the opening 136 and into engagement with the projecting end of the control member 114. This will occur at some predetermined pressure differential across the power diaphragm 10; and at this point, a reaction force will begin to be applied to the control member 114 resisting its actuating movement. As the pressure in the control chamber 78 rises above this point, the reaction force on the control member 114 forces it rearwardly to bring its atmospheric valve seat 112 into sealing engagement with the rubber diaphragm structure 106. Thereafter no further change in pressure in the control chamber 78 occurs.

If the operator desires to release some of the braking action, a reduction of force on the pedal P allows the rubber block 134 and spring 116 to force the atmospheric valve seal 112 rearwardly to lift the rubber diaphragm structure 106 out of engagement with the vacuum valve seat 100, and thereby reduce the pressure within the control chamber 78. Reaction force upon the block of rubber 134 will thereby be decreased until it drops slightly below the force being applied to the pedal P, whereupon the control member 114 moves forwardly to again seat the rubber diaphragm structure 106 on the vacuum valve seat 100. A complete release of the braking system is had by removing all force from the foot pedal lever P; whereupon the spring 114 holds the diaphragm structure 106 off of the vacuum valve seat 100 to again communicate full vacuum to the control chamber 78.

Whenever a vacuum failure occurs, atmospheric pressure will build up in each of the chambers 66, 78 and 48 of the fluid pressure motor B. Actuation of the foot pedal lever P at this time will move the control member 114 forwardly to seat the diaphragm structure 106 against the vacuum valve seat, and lift the atmospheric valve seat 112 from the diaphragm structure. Inasmuch as all chambers of the fluid pressure motor B are already at atmospheric pressure, no actuation occurs; and the force applied to the foot pedal lever P will continue to force the control member 114 forwardly until its shoulder 138 engages the partition member 98. Thereafter, the force applied by the operator is directly applied to the tubular valve housing 82 which in turn applies force through the rubber reaction disc 134 to the reaction plunger 124, and thence through the force transmitting link 128 to the force transmitting rod 54. This force drives the rod 54 forwardly, thereby causing the threaded nut 58 of the reaction diaphragm structure 12 to engage the threaded nut 44 of the power diaphragm structure 10 and thereby drive the hydraulic piston 22 forwardly to actuate the braking system manually.

With the arrangement above described, it will readily be seen that an appreciable mechanical advantage can be provided in the force transmitting leverage system D, so that the foot pedal lever P can be designed to have a correspondingly smaller mechanical advantage. This has the practical advantage of allowing parts of the control valve structure C to be made considerably smaller than would otherwis be necessary so that in some instances most of the valve structure can be made out of molded plastic.

It will be apparent that the objects heretofore enumerated as well as others have been accomplished; and that there has been provided a new and improved servomotor control system wherein the control valve structure can be located remotely; and wherein the manual force applied to the valve structure is but a fraction of the force transmitted to the driven elements.

While the invention has been described in considerable detail, I do not wish to be limited to the particular embodiments shown and described; and it is my intention to cover hereby all novel adaptations, modifications and arrangements thereof which come within the practice of those skilled in the art to which the invention relates.

I claim:
1. In a servomotor control system: a fluid pressure motor housing adapted to be fixed to a stationary support, opposing movable walls in said housing defining a variable pressure chamber therebetween, a control valve housing adapted to be spaced apart from said fluid pressure motor housing, said valve housing having a control port for communication with said variable pressure chamber, means for attaching said valve housing to a stationary support, said valve housing having a normal position in said means from which it is movable in a forward direction, said valve housing having valve means therein including a control member having a normal position therein from which it is moved forwardly to increase the pressure in said control port, said valve housing having a forwardly extending reaction chamber with a rear end wall, said rear end wall having an opening communicating with said control member, a block of pressurizable elastomeric material positioned in said reaction chamber against said end wall, a reaction member positioned against the front surface of said block of pressurizable material, a reactionary leverage system transferring force from one of said movable walls in a rearward direction upon said reaction member to oppose actuating movement of said control member, and abutment means for limiting rearward movement of said valve housing.

2. In a servomotor control system:
   a fluid pressure motor housing;
   at least two independent movable walls in said housing having a sealed variable pressure chamber therebetween;
   a control valve housing remote from said fluid pressure motor housing, said valve housing having a control port and including a valve means adapted to control said variable pressure chamber, a reactionary means to provide feel in operation of said valve means, and a plunger operatively connected to said valve means through said reactionary means;
   a means communicating said control port to said variable pressure chamber; and
   a reactionary leverage system connecting one of said movable walls to said plunger whereupon both of said movable walls may be manually controlled by translation of said valve means.

3. For a vehicle a servomotor comprising:
   a fluid pressure motor housing having at least two movable walls therein one of which is arranged to operate an output member, said movable walls having abutting portions and being in spaced relation to enclose a pressurizable chamber;
   a control valve body remotely situated as regards said motor housing, said valve body including valve means and a control port, which control port is communicated to said pressurizable chamber;
   a plunger arranged in said control valve body;
   a reactionary structure between said plunger and said valve means; and
   said plunger having a lever connecting said plunger and said movable wall spaced from said one movable wall operating said output member.

References Cited in the file of this patent
UNITED STATES PATENTS

| | | |
|---|---|---|
| 2,197,075 | Fitzgerald | Apr. 16, 1940 |
| 2,826,177 | Price | Mar. 11, 1951 |
| 2,828,719 | Ayers | Apr. 1, 1958 |
| 2,902,006 | Price | Sept. 1, 1959 |
| 2,976,850 | Stelzer | Mar. 28, 1961 |
| 3,013,536 | Cripe | Dec. 19, 1961 |